(12) United States Patent
Knoefler et al.

(10) Patent No.: US 7,725,230 B2
(45) Date of Patent: May 25, 2010

(54) METHOD AND COMPUTER SYSTEM FOR OPERATING AT LEAST TWO INTERCONNECTED CONTROL UNITS

(75) Inventors: Eckehard Knoefler, Marbach (DE); Tobias Lang, Kirchberg (DE); Peter Fink, Wadern-Wedern (DE); Martin Lunt, Markgroeningen (DE); Bernd Illg, Eppingen (DE); Arno Hafner, Hinterbruehl (AT)

(73) Assignee: Robert Bosch GmbH, Stuttgart (DE)

( * ) Notice: Subject to any disclaimer, the term of this patent is extended or adjusted under 35 U.S.C. 154(b) by 1016 days.

(21) Appl. No.: 10/527,601

(22) PCT Filed: Sep. 16, 2003

(86) PCT No.: PCT/EP03/10285

§ 371 (c)(1), (2), (4) Date: Apr. 24, 2006

(87) PCT Pub. No.: WO2004/027530

PCT Pub. Date: Apr. 1, 2004

(65) Prior Publication Data

US 2006/0235594 A1 Oct. 19, 2006

(30) Foreign Application Priority Data

Sep. 16, 2002 (DE) ................ 102 43 088

(51) Int. Cl.
*G06F 17/00* (2006.01)
(52) U.S. Cl. .............. 701/48; 701/202; 701/208; 701/213; 340/435; 340/531
(58) Field of Classification Search ............. 701/202, 701/48; 340/531, 435
See application file for complete search history.

(56) References Cited

U.S. PATENT DOCUMENTS

| 5,218,604 | A | * | 6/1993 | Sosnosky | ............... 370/223 |
| 5,748,923 | A | * | 5/1998 | Eitrich | ............... 710/305 |
| 5,761,460 | A | * | 6/1998 | Santos et al. | ............... 710/305 |

(Continued)

FOREIGN PATENT DOCUMENTS

DE     44 08 488     9/1995

(Continued)

OTHER PUBLICATIONS

"Traffic and Traveller Information (TTI) TTI Messages via Traffic Message Coding", Draft prENV/278/4/1/0012, 1994, pp. 1054, XP002285633.

*Primary Examiner*—Thomas G Black
*Assistant Examiner*—Wae Louie
(74) *Attorney, Agent, or Firm*—Kenyon & Kenyon LLP (57) ABSTRACT

A method and a computer system for operating at least two interconnected control units. The control units access sensor data and each execute at least one computer program for controlling operational sequences, in particular in a vehicle. The control units exchange synchronization information with one another. In order to design and refine a computer system in a way that will enable even especially complex operational sequences, as required in a modern motor vehicle, for example, to be controlled and/or regulated simply and cost-effectively with the aid of the computer system, using conventional control units, the control units execute the same computer program time-synchronously using a settable time lag.

17 Claims, 7 Drawing Sheets

U.S. PATENT DOCUMENTS

| | | | |
|---|---|---|---|
| 6,622,083 B1* | 9/2003 | Knockeart et al. | 701/202 |
| 6,894,610 B2* | 5/2005 | Schubert et al. | 340/531 |
| 7,191,040 B2* | 3/2007 | Pajakowski et al. | 701/1 |
| 7,552,009 B2* | 6/2009 | Nelson | 701/208 |
| 2002/0072853 A1* | 6/2002 | Sullivan | 701/213 |
| 2003/0182033 A1* | 9/2003 | Underdahl et al. | 701/29 |
| 2005/0090940 A1* | 4/2005 | Pajakowski et al. | 701/1 |
| 2005/0197747 A1* | 9/2005 | Rappaport et al. | 701/1 |
| 2006/0235594 A1* | 10/2006 | Knoefler et al. | 701/48 |
| 2006/0238318 A1* | 10/2006 | Brouwer et al. | 340/435 |

FOREIGN PATENT DOCUMENTS

| | | |
|---|---|---|
| DE | 196 25 195 | 1/1998 |
| DE | 199 57 551 | 6/2001 |
| DE | 100 48 780 | 4/2002 |
| EP | 1543389 | 6/2005 |
| JP | 63-16275 | 1/1988 |
| JP | 1123801 | 5/1989 |
| JP | 2004537098 | 12/2004 |
| WO | WO 02/086828 | 10/2002 |

* cited by examiner

METHOD AND COMPUTER SYSTEM FOR OPERATING AT LEAST TWO INTERCONNECTED CONTROL UNITS

FIELD OF THE INVENTION

The present invention is directed to a method for operating at least two interconnected control units. The control units access sensor data and each execute at least one computer program for controlling operational sequences, in particular in a vehicle. The control units exchange synchronization information.

The present invention is also directed to a computer system including at least two interconnected control units and a data transmission medium that connects the control units in order to exchange synchronization information among the control units. The control units access sensor data and each execute at least one computer program for controlling operational sequences, in particular in a vehicle. The data transmission medium may also be used for transmitting pure useful data. The transmission of the data itself may be utilized as synchronization information.

BACKGROUND INFORMATION

From the motor vehicle sector, it is known to use control units to control and/or regulate various operational sequences in a motor vehicle. The operational sequences to be controlled or regulated include, for example, the operation of an internal combustion engine (torque control, speed control, injection period control, etc.), of a steer-by-wire system, of a brake-by-wire system or of other X-by-wire systems, the operation of safety-related functions (vehicle-stability control systems, antilock systems for the brakes, anti-slip control, active steering systems, active shock absorber systems, etc.), as well as comfort and convenience functions (air-conditioning, electrical seat adjustment, mirror actuation, or steering-wheel adjustment, electrical power-window control, sliding sun-roof, etc.).

As the complexity of operational sequences to be controlled or regulated increases, so does the complexity of the computer programs that are run on the control units for carrying out the control and, respectively, regulating functions, which ultimately also leads to higher demands on the control unit hardware. In particular, to fulfill the control and, respectively, regulating functions, it is necessary to process an ever increasing amount of sensor signals that are made available by sensors via inputs to the control unit. However, the number of inputs of one control unit is limited. For that reason, to render possible the control and/or regulation of advanced, complex operational sequences, the need exists to develop and market control units having a larger number of inputs. However, it is a complex and cost-intensive process to develop new control units. Such new developments would make available more diverse control units, but would decrease the number of individual control units, so that additional costs would likewise be entailed for control units.

However, in the motor vehicle sector, in particular, low costs and associated standardized components, as well as high piece numbers are vitally important to the competitiveness of components.

Today, conventional standard control units already have plugs with fewer terminals than would actually be required for complex operational sequences in motor vehicles. However, for the reasons described above, new control units having plugs with more terminals will not be made available in the foreseeable future. Thus, it is essential to discover other ways for controlling and/or regulating advanced, complex operational sequences using standard control units.

From the information technology sector, it is known to interlink a plurality of computers (for example, so-called PCs, personal computers) via a data-transmission medium to a computer system. The data-transmission medium can be a wireless link, an optical connection or a wire-based connection. Data and information can be transmitted via the data-transmission medium in accordance with user-defined protocols. Various computer programs having different functions are run on the computers of such distributed computer systems. The sequences on the individual computers are coordinated by a higher-level unit or by a computer (so-called master) of the computer system. For this purpose, it is possible for the master to transmit synchronization information via the data-transmission medium to the other computers (co-called slaves). The distributed computer systems make possible a greater computing capacity with respect to computing power and memory capacity, and they are characterized by substantial flexibility. In this context, the larger number of inputs and/or outputs of the computer system as compared to individual computers is unimportant. Moreover, input signals incoming at one computer of the computer system are not necessarily required at other computers as well and are, therefore, also not transmitted by the one computer to the remaining computers. This is because various computer programs requiring, as a rule, different input signals are run on the computers.

SUMMARY OF THE INVENTION

It is, therefore, an object of the exemplary embodiment and/or exemplary method of the present invention to provide a computer system in such a way that, with the aid of the computer system, even especially complex operational sequences, as occur, for example, in a modern motor vehicle, will also be able to controlled and/or regulated simply and cost-effectively using conventional control units.

To achieve this objective, the method of the type described herein is implemented and used to provide that the control units execute the same computer program time-synchronously while using a settable time lag.

The exemplary embodiment and/or exemplary method of the present invention provides for a plurality of control units to be linked via a data-transmission medium to a computer system. In this context, it is less a question of increasing the computing capacity than it is of increasing the number of available inputs for transmitting sensor data to the control units. The same computer programs are executed on all of the control units; i.e., the control units require the same input signals (sensor data) in order to be able perform the computations required for fulfilling the control and/or regulating function. In accordance with the exemplary embodiment and/or exemplary method of the present invention, however, not all sensor signals are fed via the inputs to all of the control units. Rather, the totality of the sensor data that is required by the computer programs and that is available is distributed among the individual control units of the computer system. The sensor data are then transmitted by this control unit via the data-transmission medium to the other control units of the computer system to make them available there as well.

The computer programs in the individual control units are executed synchronously, which may be time-synchronously, i.e., in strictly predefined time slices. However, a certain amount of time is required to transmit sensor data via the data-transmission medium during which the sensor data are not yet available in all control units. Moreover, the sensor data are not simultaneously available on all control units, since the time required to transmit the sensor data varies. For example, the time period required depends on the distance between the transmitting and receiving control unit, on the capacity utilization of the data transmission medium, or on interference which can degrade the data transmission. Due to the requirement for data consistency in the control units of the computer system and in order to allow for the time delay needed to transmit the sensor data, the control units of the computer system are operated with a time lag, and the computer programs in the control units are not executed until after a settable dead time has elapsed following the beginning of a time slice. The dead time is utilized for exchanging the sensor data and, possibly, other data and information as well, among the control units. The time lag is either absolute, i.e., based on a superordinated time-slot pattern, is equal in magnitude for all control units of the computer system, or is a relative time lag, i.e., a time lag of individual control units relative to each other. Typically, it is a question of a relative time lag between a master control unit and slave control units of the computer system, as well as among the slave control units.

In a computer system in which the control units are interconnected via unidirectional data transmission media, approximately twice as much time is required for transmitting data as in a computer system having bidirectional transmission media. The time lag shall now be clarified based on the example of a computer system having two control units: Both control units receive individual (unit-specific) sensor data. The first control unit subsequently transfers the data received by the sensors to the second control unit. At this point, the sensor data received directly from the sensors, as well as the sensor data received from the first control unit are available there (at the second control unit), so that the system may already begin with the pending time slice and execution of the computer program. After receiving the sensor data, the second control unit, in turn, transfers the sensor data received from the sensors to the first control unit, where, at this point, the system may begin with the pending time slice and execution of the computer program with a time delay relative to the first control unit. It is understood that the results calculated by the two control units, such as drive signals for actuators, must first be buffer-stored in an intermediate memory, in order to then be jointly read out and used to act on the actuators simultaneously.

The exemplary embodiment and/or exemplary method of the present invention has, moreover, the advantage that standard control units having fewer inputs may be used for controlling and/or regulating complex operational sequences, as are increasingly required in motor vehicles, for example, in order to process available sensor data to fulfill the control and, respectively, regulating function. By linking the control units to the computer system, other additional inputs are virtually emulated for the individual control units. By using standard control units, the costs may also be kept low for controlling and/or regulating complex operational sequences as well.

In the case that the sensor data are only available at one single control unit, the exemplary embodiment and/or exemplary method of the present invention also makes it possible to safeguard and ensure the data consistency in that all control units of the computer system actually have the same data available to them. If the analog sensor data were fed to a plurality of control units of the computer system, different limits for the A/D- (analog-digital) conversions performed in the control units could result in different digital values being present in the control units for the sensor data, with the result that a data consistency would no longer exist. The exemplary embodiment and/or exemplary method of the present invention is able to prevent this since each sensor datum is only received by one single control unit and is A/D converted there.

In accordance with one embodiment of the present invention, the same sensor data are available in the control units. Thus, the transfer of the sensor data among the control units is carried out in such a way that, following the transfer of the sensor data, the same sensor data are available in their totality in all of the control units. In this context, the same sensor data in the various control units have identical values.

Due to the fact that all of the control units run the same computer programs and perform the same calculations on the basis of identical sensor data and, given functional control units and, respectively, properly functioning computer programs, would have to arrive at the same results, hardware and/or software may be used for monitoring for correct functioning. This may be accomplished, for example, by comparing the ascertained results or by carrying out a redundancy sampling (sampling n from m, n being<m).

One embodiment of the present invention provides for each of the control units to receive only one portion of all sensor data from sensors and for the control units to exchange sensor data, with the result that all sensor data are available in each control unit. In this specific embodiment, other additional inputs are virtually emulated for the individual control units, so that, in spite of the use of standard control units (having a limited number of inputs for sensor signals), complex operational sequences may also be controlled and/or regulated (while processing more sensor signals than one single control unit has inputs). This enables the costs to also be kept low for controlling and/or regulating complex operational sequences as well.

The time lag is advantageously adjusted as a function of the time duration required for exchanging the sensor data among the control units. The time lag, which the control units observe when executing the computer programs, may be set in advance prior to operation of the computer system. However, the time lag may be adjusted during operation of the control units, thus during the computer system's run time.

In accordance with another advantageous embodiment of the present invention, the time lag is regulated as a function of the time duration required for exchanging the sensor data among the control units. The regulating process helps to ensure that the time lag is always kept as small as possible and, on the other hand, however, that the time lag is not selected to be too small which could result in the computer program execution being prematurely started although the sensor data are not yet available in all control units.

In accordance with another advantageous embodiment, the time lag is adjusted or regulated in a damped manner as a function of the time duration required for exchanging the sensor data among the control units. The damping process is implemented, for example, in that the time lag, respectively a time slice, is not shortened until it has become evident multiple times in succession that the time lag has actually been set to be too long, and that the data transmission was already clearly concluded prior to the time lag elapsing. Thus, not every variation in the transmission time leads immediately and directly to a variation in the time lag. By implementing this measure, the jitter of the transmission time is virtually attenuated.

Finally, the exemplary embodiment and/or exemplary method of the present invention provides for the control units to be synchronized solely by exchanging useful data via the data transmission media, without transmitting separate synchronization information. Here, it is a question, in particular, of low-level synchronization. This is a self-optimizing time lag between the master and slaves (relative to the master). In contrast, a high-level synchronization is the synchronization of the multiplexer for establishing data consistency in the computation grids in question (master MUX=slave MUX). In the method of the present invention, it is conceivable, for example, in addition to the useful data, for a time-slice counter (task counter) to be included as scheduling information in the messages which are transmitted via the data transmission media.

Starting out from the computer system of the type mentioned at the outset, another approach for achieving the objective of the exemplary embodiment and/or exemplary method of the present invention provides that control units execute the same computer program time-synchronously using a time lag that is adjustable by a setting arrangement.

In accordance with one advantageous embodiment, one of the control units is defined as a master control unit, and the remaining control units are defined as slave control units, the master control unit transmitting synchronization information to the slave control units. The synchronization information may likewise be transmitted via data transmission media. The master control unit specifies a fixed, time-synchronous time-slot pattern that the slave control units must conform to. The computer programs, which, in principle, are the same for the master control unit and the slave control unit, are merely set by a control-unit dongle in the cable harness for operation in the master or in the slave.

In accordance with one embodiment of the present invention, once the computer system is booted up, the slave control units are automatically synchronized to the time base of the master control unit. This means that some time (for example 10 ms) after the computer system is booted up (restart, for example, after the system is switched on or after the occurrence of an error), after the synchronization process is concluded, the same time slices are started time-synchronously in the slaves as in the master. However, a different time lag may be set in the individual control units, so that the control units may begin executing the computer program at different instants, although they work time-synchronously. The information required for the synchronization is transmitted via the data transmission media.

An angularly synchronous time-slot pattern may be superposed on the time-synchronous execution of the computer programs, thereby making it possible to ensure, for example, that calculations that are dependent on the crankshaft angle of rotation are able to be carried out in any case in a timely manner, independently of the time-synchronous time-slot pattern. The angularly synchronous time-slot pattern may be implemented, for example, by interrupt commands. Messages which have been transmitted in the angularly synchronous time-slot pattern via the data transmission media have an especially high priority.

The exemplary embodiment and/or exemplary method of the present invention provides for only one portion of the sensors to be connected in each case to the control units, for the control units to receive only a portion of all sensor data in each case, and for the control units to exchange sensor data via the data transmission medium, with the result that all sensor data are available in each control unit.

An arrangement may be provided in the individual control units which make it possible to hold off on executing the computer programs time-synchronously while accessing the sensor data, until all up-to-date sensor data are available in each control unit. These data must not necessarily be the last sensor data to be read in, but may also be the data from an earlier time slice. It is important, however, that all available sensor data be equal in age, i.e., they come from the same time slice. When the data come from a previous time slice, the data processing by the computer programs is slightly delayed. In practice, however, this does not lead to any disadvantages whatsoever, since, typically, it is only a question of a delay of a few milliseconds. The stability of the controls is ensured in spite of the slight time delay.

In accordance with another embodiment of the present invention, each control unit is subdivided into a hardware level, a hardware driver level, and an application software level, the computer program for controlling the operational sequences running in the application software level, and the sensor data being transmitted independently of the application software level in the hardware driver level. Thus, the exemplary embodiment and/or exemplary method of the present invention relates essentially to the hardware driver level where the transmitting and receiving via the data transmission media, as well as the buffer-storing of the sensor data in the control units are implemented. The application software only accesses the buffer-stored sensor data regardless of whether it is a question of sensor data received directly from sensors or of sensor data received indirectly from other control units via the data transmission media. The adjustment and, respectively, control of the time lag is also implemented in the hardware driver level.

In contrast, in multicomputer concepts under known methods heretofore, it was customary for the individual control units of the computer system to be interconnected on the functional level, i.e., the master-slave data bus coupling was on the functional level. The result was that the data bus design was heavily dependent on the basic functionality of the system. Any change to the application software always necessitated adapting the data bus layout. This (disadvantage) is overcome by the exemplary embodiment and/or exemplary method of the present invention. A stable data bus layout may be ensured even when there is a change in the basic functionality.

In accordance with another embodiment, the sensors are assigned to the control units and are linked to the control units assigned to them respectively in such a way that, during operation of the computer system, a substantially uniform usage results on the average over time on the data transmission medium in both transmission directions. Of course, as the number of control units increases, this feature becomes more difficult to realize. When designing the computer system, however, care is taken to ensure that the control units transmit sensor data more or less with the same frequency that they receive sensor data. If this is not followed, the result can be longer transmission times for the sensor data and a longer time lag than would actually be necessary.

The data transmission via the data transmission medium may follow any desired protocols. Conceivable, for example, is the use of the FireWire, ByteFlight, FlexRay, of the TTP (time triggered protocol) or of the LIN (local interconnect network) protocol. The data are advantageously transmitted, however, via the data transmission medium in accordance with the CAN (controller area network) protocol.

Other features, possible applications, and advantages of the exemplary embodiment and/or exemplary method of the present invention may be derived from the following description of exemplary embodiments of the present invention, which are illustrated in the drawings. In this context, all of the described or represented features, alone or in any combination, form the subject matter of the exemplary embodiment and/or exemplary method of the present invention, regardless of their combination in the claims or their antecedents, as well as regardless of their formulation and representation in the specification and drawing, respectively.

DETAILED DESCRIPTION

As an exemplary embodiment of the present invention, reference is made in the following to the control of a relatively complex internal combustion engine of a motor vehicle having ten cylinders. The exemplary embodiment and/or exemplary method of the present invention may also be utilized, however, for controlling and/or regulating any other desired complex operational sequences, which may be in a motor vehicle.

Figure 1:
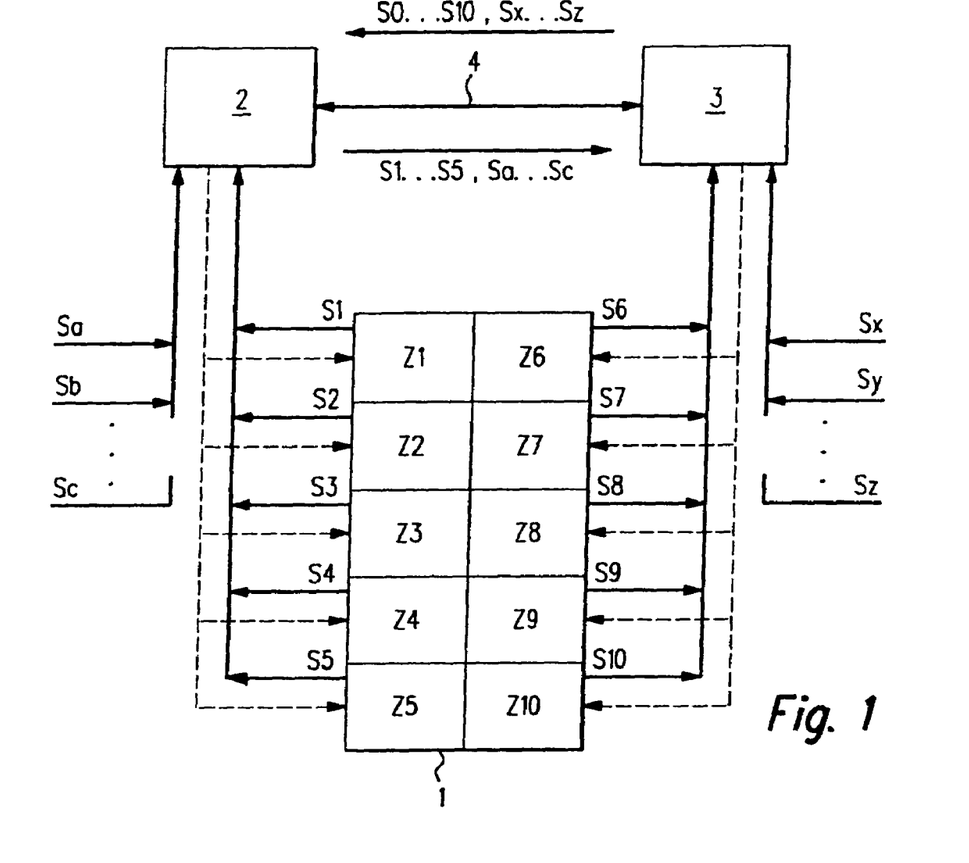
FIG. 1 shows a computer system according to the exemplary embodiment and/or exemplary method of the present invention including two control units, which are interconnected via a data bus, in accordance with one specific embodiment.

As illustrated in FIG. 1, to control and/or regulate the complex operational sequences in internal combustion engine 1, a multicomputer system is used, which includes two control units 2, 3 that are interconnected via a data transmission medium designed as a bus system 4. The data are transmitted via bus system 4 in accordance with the CAN (controller area network) protocol.

Control units 2 is defined as a master control unit and the other control unit 3 as a slave control unit. Master control unit 2 transmits synchronization information to the slave control unit. The synchronization information is transmitted in the form of CAN messages via bus system 4. Master control unit 2 specifies a fixed, time-synchronous time-slot pattern that slave control unit 3 must conform to.

The same computer programs for fulfilling the normal operational control and/or regulation functions run on both control units 2, 3. The computer programs of the two control units 2, 3 essentially process the same input signals, which are essentially composed of sensor data S1 through S10, as well as Sa through Sc and Sx through Sz. Sensor data S1 through S10 come from sensors which are located in the ten cylinders Z1 through Z10 of internal combustion engine 1. Sensor data Sa through Sc, as well as Sx through Sz come from other sensors which may be situated in or on internal combustion engine 1 or at other locations in the motor vehicle.

Since each control unit 2, 3 has only a limited number of inputs for connecting sensors, in the computer system according to the present invention, a portion of the sensors is linked to one control unit 2 and the other portion of the sensors to other control unit 3. In order that both control units 2, 3 have the same sensor data S1 through S10, Sa through Sc, Sx through Sz for executing the computer programs, the received sensor data are exchanged between control units 2, 3 via bus system 4.

Figure 2:
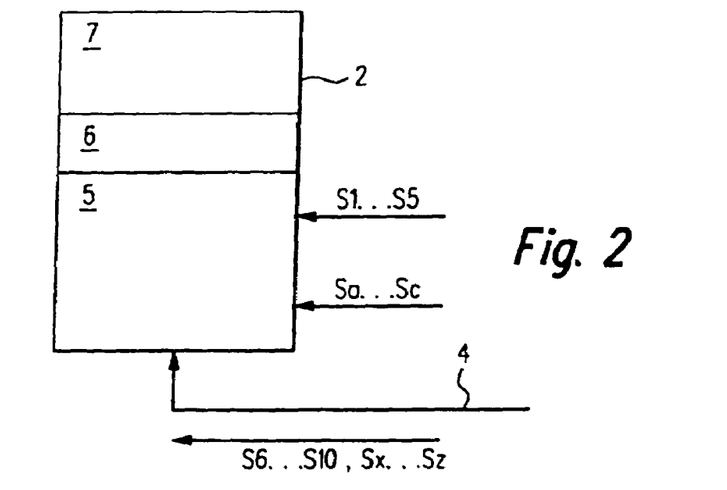
FIG. 2 shows various theoretical control unit levels of a control unit in accordance with the exemplary embodiment and/or exemplary method of the present invention.

As illustrated in FIG. 2, control units 2, 3 may be theoretically subdivided into a hardware level 5, a hardware driver level 6, and an application software level 7. In hardware level 5, control units 2, 3 are linked to bus system 4. The computer programs for controlling internal combustion engine 1 run in application software level 7 of control units 2, 3. The transmission of sensor data S1 through S10, Sa through Sc, Sx through Sz via data bus 4 takes place independently of application software level 7 and is coordinated in hardware driver level 6. Thus, the computer programs do not flag whether sensor data S1 through S10, Sa through Sc, Sx through Sz processed by them were received directly from a sensor or indirectly from another control unit 2, 3 via bus system 4. In other words, in accordance with the exemplary embodiment and/or exemplary method of the present invention, additional inputs for sensor data, which are not present as hardware, are emulated in control units 2, 3. Inputs for sensor data S1 through S5 and Sa through Sc are realized as hardware in control unit 2 illustrated exemplarily in FIG. 2, whereas sensor data S6 through S10 and Sx through Sz are received via data bus 4; i.e., the inputs for these sensor data S6 through S10 and Sx through Sz are emulated. Thus, a computer system which includes a plurality of simply designed and cost-effective standard control units, which are interconnected via data transmission media, may also be used for controlling and/or regulating tasks of very complex operational sequences, which require the processing of a multiplicity of sensor data. Moreover, the same control unit hardware may be used as the master and slave control unit.

When the various sensor data S1 through S10, Sa through Sc, Sx through Sz are fed in each case only once to one of control units 2, 3, then the inventive concept has a further advantage. This advantage resides in the fact that the data consistency is able to be safeguarded and ensured, and that all control units 2, 3 of the computer system actually have the same data available to them. If analog sensor data S1 through S10, Sa through Sc, Sx through Sz were fed in parallel to a plurality of control units 2, 3 of the computer system, different limits for the A/D- (analog-digital) conversions performed in control units 2, 3 could result in different digital values being present in control units 2, 3 for the sensor data, with the result that a data consistency would no longer exist.

It takes time for sensor data S1 through S10, Sa through Sc, Sx through Sz to be exchanged via data bus 4 between control units 2, 3. To ensure that all required current sensor data are always available in the control units at the particular intended time slices, the time slices are started in control units 2, 3 using a settable time lag. The time lag observed when starting a time slice in a control unit 2, 3 depends on the required transmission time of the sensor data via bus system 4. The time slices in a control unit 3 are started with a time lag relative to the start of the time slices in the other control unit 2.

The same computer programs for fulfilling the normal operational control and/or regulation functions run in control units 2, 3, i.e., the same input signals (for example from the sensors) are processed, and the same output signals (for example for driving actuators) are determined. In the exemplary embodiment illustrated in FIG. 1, however, only the output signals intended for actuators of cylinders Z1 through Z5 are transmitted from control unit 2 to output stages for these actuators (dashed line), whereas the output signals for cylinders Z6 through Z10 remain unused. In the same way, only the output signals intended for actuators of cylinders Z6 through Z10 are transmitted from control unit 3 to output stages for these actuators (dashed line), whereas the output signals for cylinders Z1 through Z5 remain unused.

Figure 3:
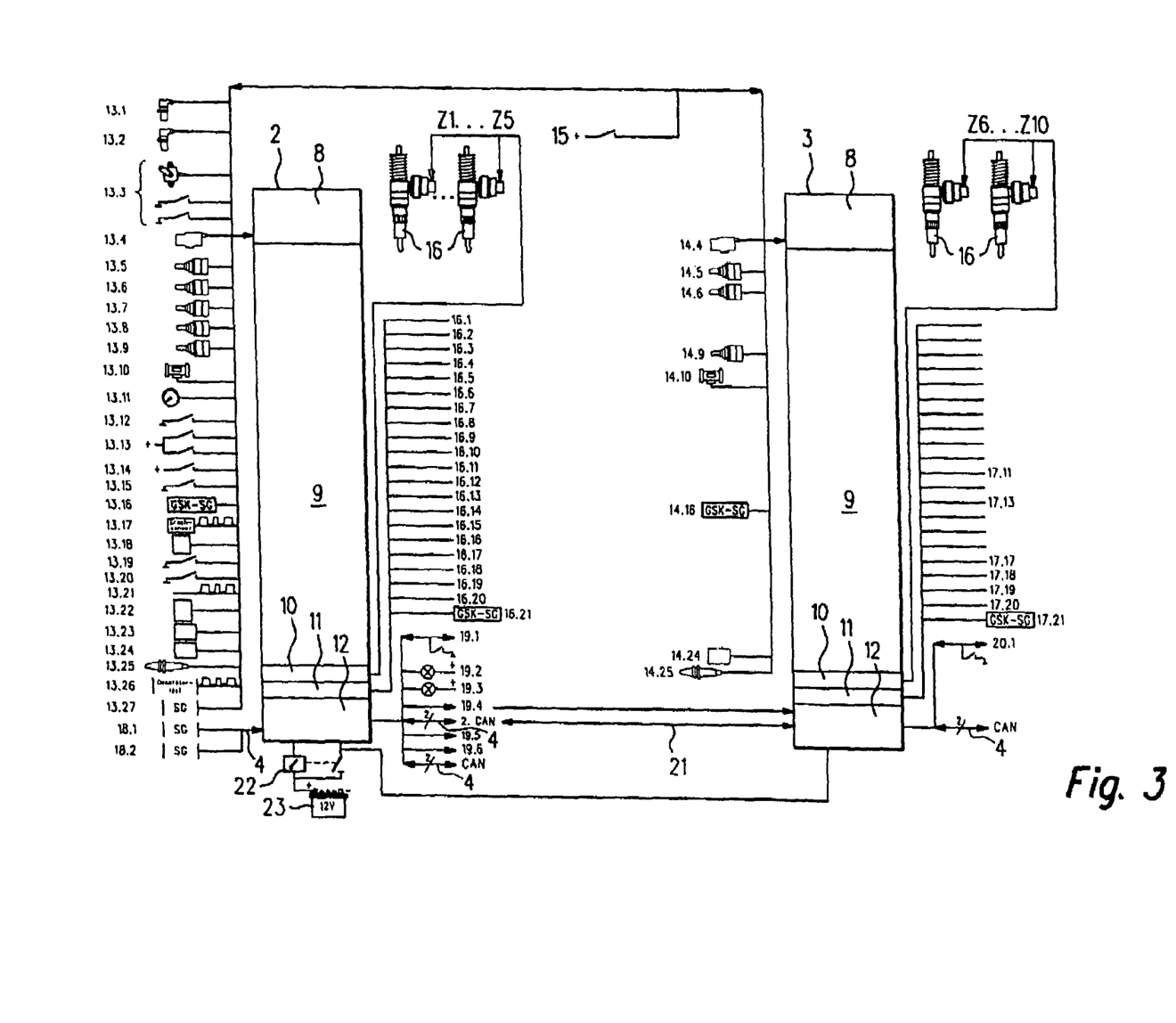
FIG. 3 shows a system diagram of a computer system according to the exemplary embodiment and/or exemplary method of the present invention including the employed sensor and actuator technology in accordance with a first embodiment.

The master-slave system according to the present invention for the engine control unit concept is designed for a plurality of control units 2, 3 which are interconnected via one CAN bus 4. FIG. 3 shows a system diagram illustrating the sensor and actuator technology used which is identical to the sensor and actuator technology used in a second design (compare FIG. 6). In the first concept according to the exemplary embodiment and/or exemplary method of the present invention, as illustrated in FIG. 3, master control unit 2 and slave control unit 3 are identical in design. The software used in the two control units 2, 3 is identical. Moreover, both control units 2, 3 are virtually identical in terms of function. They both fulfill the functions listed exemplarily in the following:

reference numeral 8:
    signal inputs
    sensor evaluation
    signal processing
    atmospheric-pressure sensor, only master control unit 2
reference numeral 9:
    starting torque
    idle-speed control
    torque control and limitation
    external torque intervention
    engine-smoothness regulator
    active surge damper
    calculation of start of pump delivery and of delivery period
    start-of-delivery correction (begin of injection period (BIP))
    boost-pressure control
    exhaust gas recirculation and throttle valve control
    exhaust gas aftertreatment
    fuel cooling control
    vehicle-speed controller or cruise control
    engine mount control
    air-conditioner compressor control
    glow-time control
    vehicle immobilizing system
    substitution functions
    adjustment
    afterrunning
reference numeral 10:
    solenoid-valve final stages
reference numeral 11:
    power output stages
reference numeral 12:
    diagnostic
    serial interface (only master control unit 2)
    angular clock coupling (only slave control unit 3)
    CAN communication The sensors listed exemplarily in the following supply sensor data to master control unit:
    13.1: engine speed
    13.2: engine speed (camshaft) and cylinder sensing
    13.3: pedal-force sensor including low-idle switch and kickdown (forced downshift) (optionally second pedal-force sensor)
    13.4: boost pressure
    13.5: air temperature
    13.6: fuel temperature
    13.7: oil temperature
    13.8: water temperature ½
    13.9: exhaust-gas temperature ½
    13.10: air mass
    13.11: vehicle speed
    13.12: GRA controller (cruise controller)
    13.13: brake (2)
    13.14: clutch
    13.15: terminal 50
    13.16: sheathed-element glow plug feedback signal
    13.17: crash sensor
    13.18: low-idle (fuel-tank empty) switch
    13.19: tank cap open
    13.20: auxiliary heater demand
    13.21: auxiliary heater consumption signal
    13.22: heat demand
    13.23: rapeseed methyl sensor
    13.24: particulate-filter differential pressure
    13.25: lambda probe
    13.26: generator load
    13.27: air-conditioning control The sensors listed exemplarily in the following supply sensor data to slave control unit 3:
    14.4: boost pressure
    14.5: air temperature
    14.6: fuel temperature
    14.9: exhaust-gas temperature ½
    14.10: air mass
    14.16: sheathed-element glow plug feedback signal
    14.24: particulate-filter differential pressure
    14.25: lambda probe Sensor data 15 (terminal 15) are available at both control units 2, 3.

Via solenoid-valve final stages 10, control units 2, 3 control the start of pump delivery and/or the delivery period of fuel injectors 16. These injectors are designed, for example, as pump-nozzle units or as common-rail injectors. As already mentioned above, control unit 2 drives fuel injectors 16 of cylinders Z1 through Z5, whereas control unit 3 drives those of cylinders Z6 through Z10. This has the advantage that, for each control unit 2, 3, it is not necessary to operate all, but merely five solenoid-valve final stages. This makes it possible to reduce the waste heat generated in control units 2, 3 by the final stages.

Via power output stages 11, control unit 2 drives actuators for the functions listed exemplarily in the following:
    16.1: engine mounts
    16.2: fuel tank shut-off valve
    16.3: start controller ½
    16.4: generator shutoff
    16.5: air-conditioner demands
    16.6: radiator cooling fan
    16.7: radiator thermostatic control
    16.8: fuel cooling
    16.9: fuel-pump relay
    16.10: fan control
    16.11: glow plug relay
    16.12: electrical cooling-water pump
    16.13: catalyst heating
    16.14: additive metering pump
    16.15: auxiliary heater relay ½

16.16: auxiliary-heater burner control
16.17: throttle-valve actuator
16.18: exhaust gas recirculation positioner
16.19: exhaust gas recirculation cooling
16.20: boost-pressure controller
16.21: sheathed-element glow plug control unit Via power output stages 11, control unit 3 drives actuators for the functions listed exemplarily in the following:
17.11: glow plug relay
17.13: catalyst heating
17.17: throttle-valve actuator
17.18: exhaust gas recirculation positioner
17.19: exhaust gas recirculation cooling
17.20: boost-pressure controller
17.21: sheathed-element glow plug control unit Via a CAN data bus 4, data from a control unit of a traction control system/engine-drag-torque control 18.1, as well as from a control unit of a transmission 18.2 are fed to master control unit 2.

In addition, signals are output by control unit 2 to the units mentioned exemplarily in the following:
19.1: diagnosis interface (ISO K) having a switching element for triggering a diagnostics request
19.2: system lamp
19.3: MIL lamp (malfunction indicator lamp, trouble localizer light for onboard diagnostics)
19.4: speed coupling
19.5: speed indication (speed signal)
19.6: fuel-consumption indicator (fuel-consumption signal)

In the case of control unit 3, an appropriate diagnosis interface (ISO K) 20.1 having a switching element for triggering a diagnostics request is provided.

In addition, data buses 4 are provided for a data exchange 21 between control units 2, 3. The data exchange is limited to sensor-signal raw values, digital signals, error statistics, controller values, and control statistics. Exchanged in particular are:
digital sensor data (following the A/D conversion of the analog sensor data fed by sensors 13, 14 to control units 2, 3)
controller adjustment information
control status information
program synchronization information.

A primary relay of the motor vehicle is denoted in FIG. 3 by reference numeral 22, the motor vehicle battery by 23.

For the most part, sensor system 13, 14 is linked to master control unit 2. Because of the completely dual-branch air and exhaust system of internal combustion engine 1, the signals, such as air mass 13.10, 14.10, air temperature 13.5, 14.5, boost pressure 13.4, 14.4, exhaust-gas temperature 13.9, 14.9, etc. are available separately at master 2 and slave 3. At the same time, however, these dual signals are consistently exchanged with each other, so that each control unit also has access to the input data of the other corresponding air branch. Moreover, a mechanism was developed for the dual sensor system's data exchange to enable a control unit 2, 3 to access the air mass, for example, and to automatically receive the air mass measured by sensor 13.10, 14.10 directly connected to control unit 2, 3. Via the access to the "external air mass", the air mass of other control unit 2, 3 that the control unit receives indirectly via data bus 4, is automatically accessed. In this way, equivalent reactions may be initiated synchronously in response to errors. Many sensors 13, 14, such as sheathed-element glow plugs 13.16, 14.16, are only detected locally in each control unit 2, 3 and are not exchanged, since they are of secondary importance to the entire system.

The time-synchronous calculations are initiated in master-control unit 2. This unit records the corresponding sensor data and transfers a portion of this raw sensor data to slave control unit 3. However, for reasons of data consistency, for the pending calculation, the unit utilizes the sensor data from the preceding, already adjusted time slice. Due to the substantial data volume, not all signals are able to be transmitted at once. The transfer is carried out as a packet transmission (for example, always five or six CAN messages) every 10 ms from master 2 to slave 3 and vice versa. Of course, any other time-slot pattern may also be used.

Figure 4:
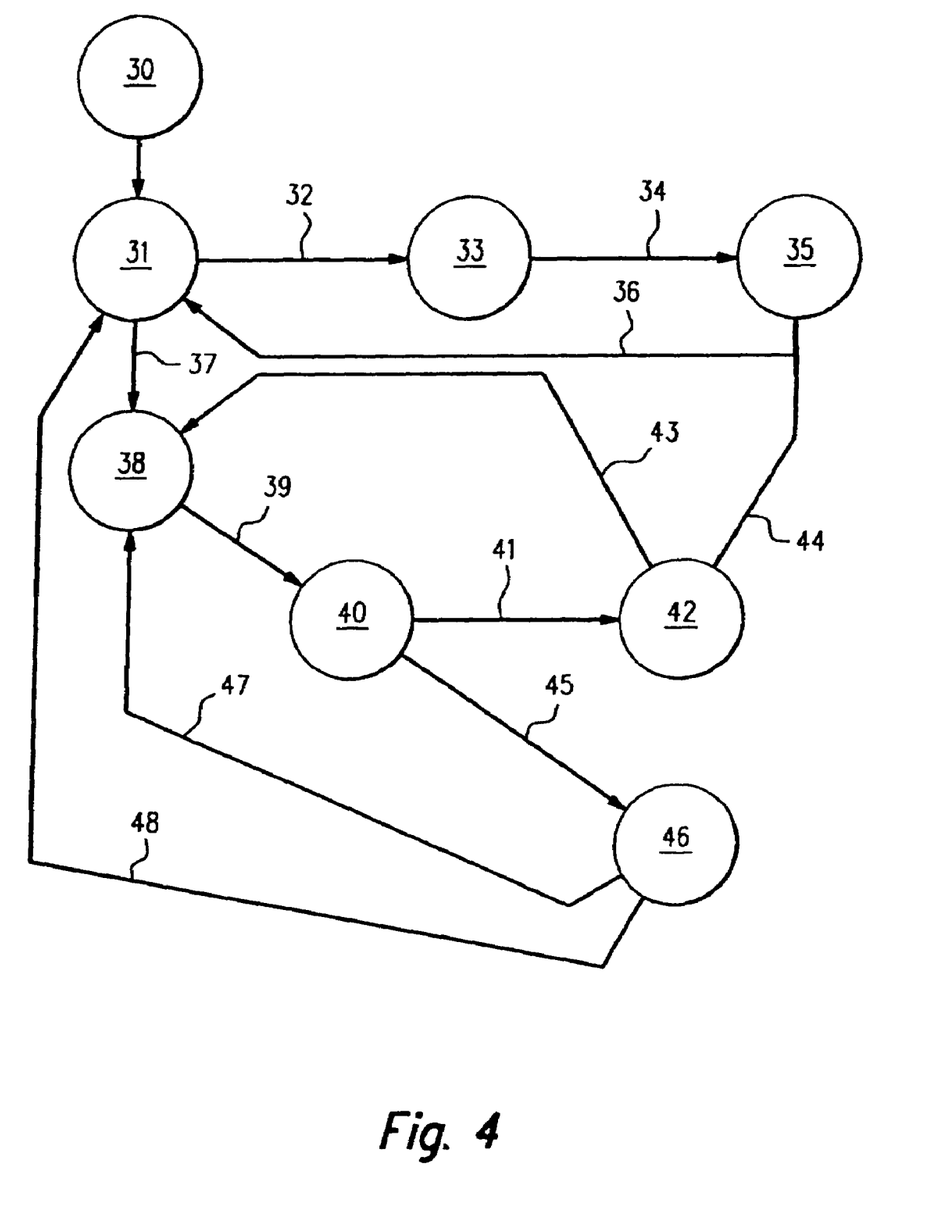
FIG. 4 shows a finite state machine for synchronizing the time slices in a slave control unit of the computer system according to the exemplary embodiment and/or exemplary method of the present invention.

If a data packet has been completely transferred to slave 3, then a finite state machine recognizes this and starts the same time slice as in master 2. The finite state machine is used for synchronizing the time slices in slave 3 and is illustrated in FIG. 4. The information regarding which time slice is being calculated at the moment is contained in each CAN transmission packet. The received data are buffer-stored in an intermediate memory, the so-called shadow buffer (compare reference numeral 51 in FIG. 5); the current time slice is calculated using identical data as master 2, stored in a so-called RAM mirror. The reason for the buffer storage is data consistency within the time slices and the relatively large data volume of one time slice. If calculation of a time slice is complete, the data exchange for the next time slice must be completed before it is started. As a result of this time expenditure for the consistent data exchange, a measurable dead time (delay) is built into the system. The signals are all delayed by one time slice, but are absolutely identical in the system.

In the case of the finite state machine illustrated in FIG. 4 for synchronizing the time slices in slave 3, after the computer system is restarted (for example after being turned on or following an error), a first state 30 (initialization) is begun. From there, the transition is made to a state 31 (period elapsed, wait for CAN). When the delay time has elapsed, without data being received from data bus 4 (condition 32), the transition is made to a state 33 (forced scheduling). A blocking time is then defined in a step 34, and the transition is made to a state 35 in which no data are read from data bus 4. Step 34 may be implemented, for example, by:

```
debounce counter --
if debounce counter = 0
                    {period = prolonged
                     reload debounce counter
}                   else
                    {period = normal}
blocking time = period – delay time
```

Alternatively, the blocking time may also be calculated as the sum of the period and delay time. During the blocking time, no data are received from data bus 4. Finally, the transition is made again to state 31 (period elapsed, wait for CAN), as soon as the blocking time has elapsed (condition 36). A blind window is quasi defined by the blocking time and pushed through the time-slot pattern by shortening or lengthening the time slices, until the time-slot pattern of slave 3 conforms with that of master 2, and the same time slices are executed time-synchronously in master 2 and slave 3 (to all intents and purposes, however, with the time lag mentioned above). The blocking time (the blind window) is used to improve the interference immunity of the synchronization of control units 2, 3. During the blocking time, no data may arrive via bus 4. Thus, any unnecessary shortening of the time slice is prevented.

When, in state 31, data are received from data bus 4 during the delay time (condition 37, CAN object newData), the transition is made to a state 38 (start schedule). From there, in a step 39, the transition may be made to a state 40 (schedule blocked). Step 39 may be implemented, for example, by:

```
if debounce counter = 0
    {period = shortened
    blocking time = blocking time for shortened period
    debounce counter = debounce counter for shortening
}   else
    {period = normal
    blocking time = blocking time for normal period)
```

In state 40, a blind window is quasi defined, in the case that an error occurs. A decision is made as to whether the period is shortened. In the case that a condition 41 (blocking time elapsed, CAN up-to-date and debounce counter --) is fulfilled, the transition is made to a state 42 (CAN up-to-date, wait for end of period). In state 42, however, slave 3 is not scheduled to observe data bus 4, rather it flags if a CAN message had been completely received at an earlier point in time (i.e., prior to expiration of the time delay). If the period is elapsed (condition 43), slave 3 makes the transition again to state 38. If all messages were not yet received in state 42, due to excessive shortening of the period (condition 44, period expired, CAN old, debounce counter=debounce counter for lengthening), the system reverts to state 31. If a condition 45 (blocking time expired, CAN old and debounce counter=debounce counter for shortening) is fulfilled, slave 3 changes to a state 46 (wait for end of period), where the period is shortened. If all messages were received (condition 47, period expired, CAN up-to-date, debounce counter=debounce counter for shorten), slave 3 reverts to state 38. If all messages were not yet received, due to excessive shortening of the period (condition 48, period expired, CAN old, debounce counter=debounce counter for lengthening), the system reverts to state 31.

Thus, in summary, it can be said about the finite state machine from FIG. 4 that: Master control unit 2 specifies the time-slot pattern, i.e., it indicates which number time slice should be started by slave control unit 3. If the numbers of the time slices of master 2 and slave 3 pending execution differ, the time slices of slave 3 are shortened or lengthened to a greater or lesser extent, and the computer system is operated with time slices which vary in length, until the numbers of the time slices of master 2 and slave 3 are identical.

A special data synchronization strategy is used during the initialization between master 2 and slave 3. During the initialization process, analog values are measured. These values are used to initialize a PT1 filter. In a master-slave computer system, the problem arises that the component drivers access values that are buffer-stored in the read-write memory (RAM mirror). During the initialization, this read-write memory does not yet contain any valid values. Thus, the PT1 filter is initialized incorrectly.

For that reason, during initialization, the following strategy is used for purposes of signal acquisition:
a) During the initialization routine, a request bit is set in the status register for all signals contained in the data sets. Thus, in any case, hardware is accessed in response to the first invoking (call) of the component driver. This first valid signal value is stored in accordance with the computer system in the intermediate memory (shadow buffer). The component driver utilizes the incorrect value from the read-write memory.

b) Equalization of the signals of the initialization task (reference numeral 30 in FIG. 3): Task 30 has a task counter 10. It is only executed in response to control unit reset. In a signal initialization process, master 2 and slave 3 send the CAN data of initialization task 30. This process is carried out at the end of the initialization to ensure that all hardware accesses of the initialization are complete, thus that the intermediate memory is filled with valid values. After sending the data of initialization task 30, master 2 and slave 3 wait to receive the data packet. The maximum delay time may be applied via a label. Immediately after receipt, the data are decoded and thus stored in a separate intermediate memory. (This code section is run through nearly simultaneously in master 2 and slave 3. Here, a synchronization of the time bases is possible in master 2 and slave 3.) At this point, each control unit 2, 3 has all signal values that are valid for the initialization stored in the intermediate memory.
c) Updating the signals of initialization task 30: copying the signal values from the intermediate memory into the read-write memory.
d) Invoking the initialization process of the signals which initialize the PT1 filter in the initialization.
e) Normal operation of the computer system during vehicle operation of the internal combustion engine (drive mode).

If master 2 executes a reset during vehicle operation, it runs through the initialization (compare above) and sends the data packet of initialization task 30 to CAN bus 4. Slave 3 receives the data packet. The time-synchronous scheduling process does not start any task, but sends the data packet to CAN bus 4. Following evaluation of this data packet, master 2 continues its initialization; compare point c) above.

If slave 3 executes a reset during vehicle operation, it runs through the initialization (compare above) and sends the data packet of initialization task 30 to CAN bus 4. Master 2 receives the data packet. In the time-synchronous master-slave component driver starting process, it recognizes the data packet request from slave 3, and does not send the data of the current task, but rather the data of initialization task 30. Following evaluation of this data packet, slave 3 continues its initialization; compare point c) above.

Figure 5:
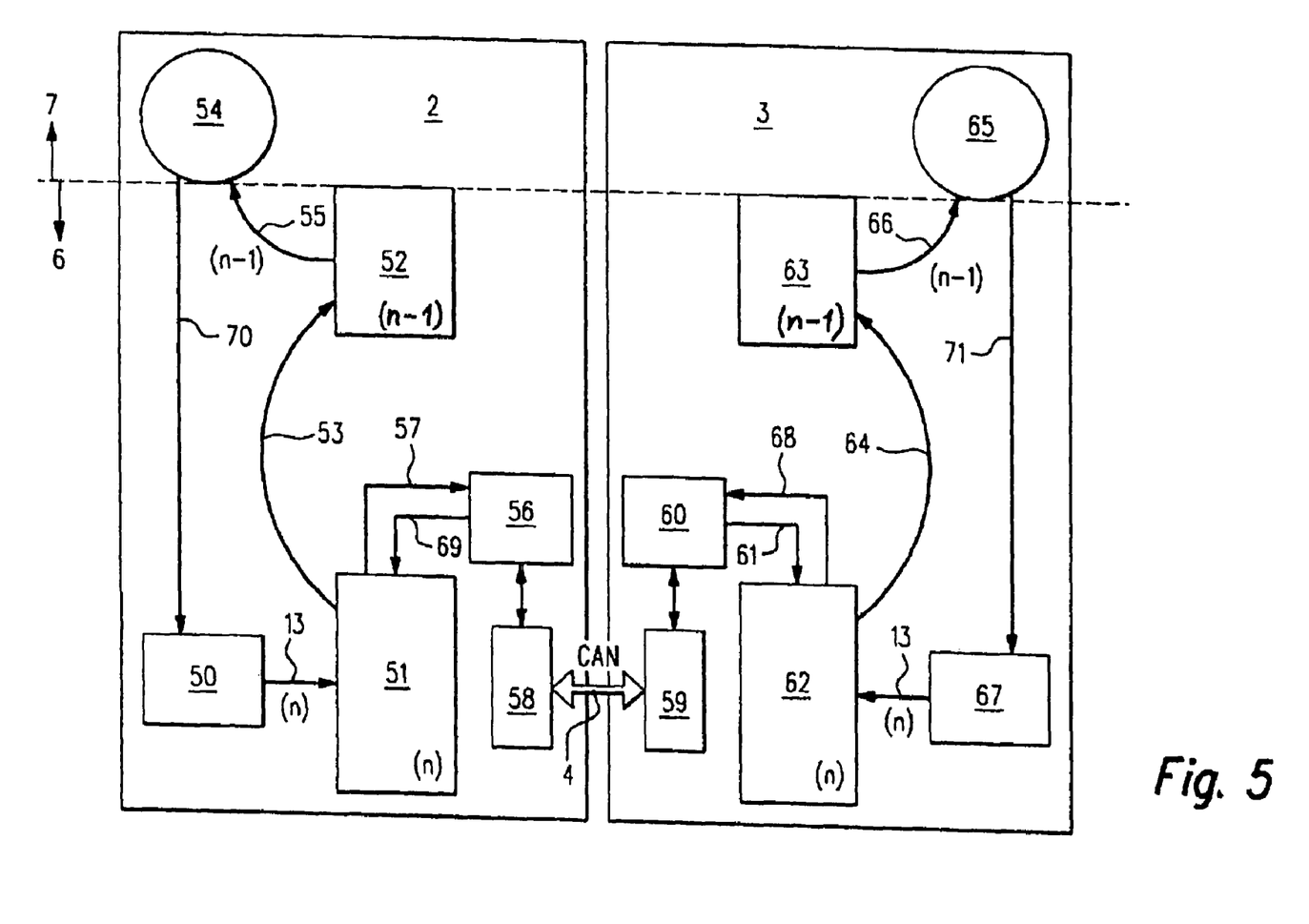
FIG. 5 shows a computer system according to the exemplary embodiment and/or exemplary method of the present invention for illustrating the message and signal storage.

The storing of messages and signals in the computer system according to the present invention is clarified with reference to FIG. 5. In master control unit 2, sensor data 13 from relevant hardware (sensors 50) are fetched and buffer-stored in the intermediate memory (shadow buffer 51). To update sensor data 13 utilized for calculation purposes in master 2 in the subsequent time slice, to the updated status, current sensor data 13 are copied from intermediate memory 51 into a read-write memory (RAM mirror 52). From this memory, they are then read out, as needed, by computer programs 54 running on master 2 and used for calculations (step 55). Moreover, updated sensor data 13 are read out from intermediate memory 51 and buffer-stored (step 57) in a message memory (message buffer 56). From there, they are then transmitted via a dual port RAM 58 and data bus 4 to slave control unit 3.

In slave 3, updated sensor data 13 from master 2 are buffer-stored via a dual port RAM 59 in a message memory (message buffer 60). From there, sensor data 13 are then transferred in a step 61 into an intermediate memory (shadow buffer 62). To update sensor data 13 utilized for calculation purposes in slave 3 in the subsequent time slice, to the updated status, current sensor data 13 received from master 2 are copied from intermediate memory 62 into a read-write memory (RAM mirror 63). From this memory, they are then read out, as needed, by computer programs 65 running on slave 3 and used for calculations (step 66).

Moreover, in slave control unit 3, sensor data 13 from relevant hardware (sensors 67) are fetched and buffer-stored in intermediate memory (shadow buffer) 62. To update sensor data 13 utilized for calculation purposes in slave 3 in the subsequent time slice, to the updated status, current sensor data 13 are copied from intermediate memory 62 into read-write memory 63 (step 64). From this memory, they are then read out, as needed, by computer programs 65 running on slave 3 and used for calculations (step 66). Moreover, updated sensor data 13 are read out from intermediate memory 62 and buffer-stored (step 68) in a message memory (message buffer) 60. From there, they are then transmitted via dual port RAM 59 and data bus 4 to master control unit 2.

In master 2, updated sensor data 13 from slave 3 are buffer-stored via a dual port RAM 58 in message memory (message buffer) 56. From there, sensor data 13 are then transferred in a step 69 into intermediate memory (shadow buffer) 51. To update sensor data 13 utilized for calculation purposes in master 2 in the subsequent time slice, to the updated status, current sensor data 13 received from slave 3 are copied from intermediate memory 51 into read-write memory 52 (step 53). From this memory, they are then read out, as needed, by computer programs 54 running on master 2 and used for calculations (step 55).

While sensor data 13 of the current time slice (processed at instant n) are stored in intermediate memories 51, 62, the actual execution of computer programs 54, 65 takes place on the basis of sensor data 13 of the preceding time slice (processed at instant n−1). From application software level 7, computer programs 54, 65 send requests 70, 71 for new values for sensor data 13 to hardware driver level 6. The execution of the above described sequences involving steps 50 through 69 goes unnoticed by application software level 7. It merely registers new values for sensor data 13 being communicated to it in steps 55 and 66. It is unimportant to application software level 7 where, precisely, the data come from and whether it is a question of current data or of data of the preceding time slice.

To ensure a correct data exchange between master 2 and slave 3, three different signal/message intermediate memories are required (compare FIG. 5):

MS message buffer 56, 60: for buffer-storing complete CAN messages

Shadow buffer 51, 62: for buffer-storing individual signals, until all signals of a 20 ms/100 ms time slice are exchanged. Within the framework of receiving messages, sending messages, and up-dating the RAM mirror, the shadow buffer is accessed exclusively via the master slave driver.

RAM mirror 52, 63: contains all signals used for the current calculations. Signal accesses are made to this buffer instead of to the hardware (for example, A/D converter).

To ensure data consistency already during run-up of control units 2, 3, a special strategy was developed for synchronizing selected data prior to the actual start of the computer program. It is advantageous in this context for a very particular instant to be executed simultaneously (in the 100 microsecond range) in the computer program of master 2 and slave 3. This makes it possible for the time bases of individual control units 2, 3 to be adjusted. Thus, for example, glow-plug control signals in master 2 and slave 3 may be precisely interleaved in order to minimize drops in the battery voltage.

Besides the sensor data, any data at all from the application software may be included as so-called user signals in this signal exchange. However, these signals are not buffer-stored in order not to unnecessarily degrade their timeliness (up-to-date status). Depending on the selection of the transmission instant, these signals may also be used identically in the master and slave time slice.

It is possible to shift sensors or actuators to the other control unit while expending relatively little outlay for changing the configuration, since all actuator values in both control units 2, 3 are calculated, and the output stage errors are coupled.

The security concept of the master slave system will not be discussed in greater detail at this point. A few key points are merely listed exemplarily in the following:

CAN bus hardware monitoring;

CAN bus data monitoring for receiving and sending;

CAN bus data monitoring using the checksum method for a complete data packet;

monitoring the correct time slice sequence in each control unit 2, 3;

monitoring the correct time slice sequence of slave 3 by master 2; and recognizing a control unit reset during operation by the other control unit.

Both control units 2, 3 execute the same computer program synchronously with a settable time lag and are able to access the same sensor data 13. Thus, in these respects, it is actually a master-master design.

Figure 6:
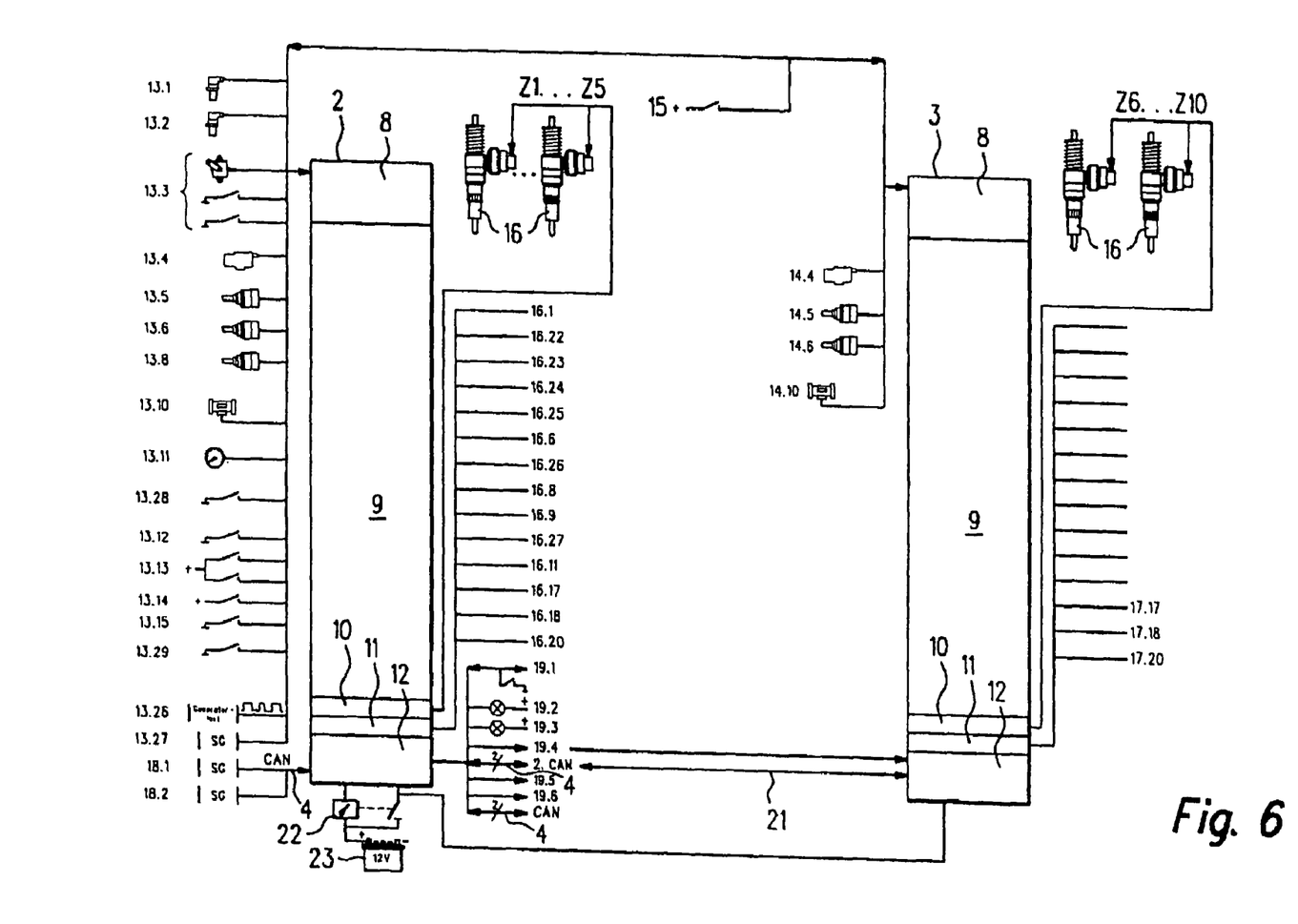
FIG. 6 shows a system diagram of a computer system according to the exemplary embodiment and/or exemplary method of the present invention including the employed sensor and actuator technology in accordance with a second embodiment.

FIG. 6 shows a system diagram illustrating another exemplary embodiment of the computer system according to the present invention, including the sensor and actuator technology used. In comparison to the exemplary embodiment shown in FIG. 3, in the exemplary embodiment illustrated here, missing in master 2 is a sensor 13.7 for measuring the oil temperature, a sensor 13.9 for measuring the exhaust-gas temperature, as well as a sensor 13.16 for the glow element feedback signal, a crash sensor 13.17, a low-idle (fuel-tank empty) switch 13.18, a switch 13.19 for indicating the status (open, closed) of the fuel-tank cap, a switch 13.20 for indicating a request for auxiliary heating, a sensor 13.21 for the auxiliary heater consumption signal, a sensor 13.22 for heat demand, a rapeseed methyl sensor 13.23, a sensor 13.24 for the differential pressure in the particulate filter, and a lambda probe 13.25. In addition, in the exemplary embodiment shown in FIG. 6, a switch 13.28 is provided for a MIL (malfunction indication lamp) request and a switch 13.29 for the status of a time-delay relay for preheating. In the case of slave 3, a sensor 14.9 is missing for the exhaust-gas temperature, as well as a sensor 14.16 for the glow element feedback signal, a sensor 14.24 for the differential pressure in the particulate filter and a lambda probe 14.25.

The actuators, which are driven by master 2 via power output stages 11, do not include a fuel tank shut-off valve 16.2, a start controller 16.3, a generator shutoff 16.4, an air-conditioner demand 16.5, a radiator thermostatic control 16.7, a fan control 16.10, an electrical cooling-water pump 16.12, a catalyst heating 16.13, an additive metering pump 16.14, a supplemental relay 16.15, an auxiliary-heater burner control 16.16, an exhaust gas recirculation cooling 16.19 or a sheathed-element glow plug control unit 16.21. Provided, instead, are actuators for a radiator fan bypass/shut-off relay 16.22, a replenishing pump 16.23, a radiator-fan charge air 16.24, a hydraulic radiator fan 16.25, a radiator thermostat heating 16.26, and an air-conditioner shutoff 16.27. The actuators, which are driven by slave 3, do not include a glow plug relay 17.11, a catalyst heating 17.13, an exhaust gas recirculation cooling 17.19 or a sheathed-element glow plug control unit 17.21. The data (reference numeral 21) transmitted via data bus 4 between master 2 and slave 3 relate, in particular, to the volume, i.e., the trailing-throttle status, a cylinder counter, a control status, as well as input variables for exhaust gas recirculation and boost-pressure control.

Functions 9 of master 2 do not include any exhaust gas aftertreatment and, instead of a starting torque, a starting-fuel quantity is considered. Functions 9 of slave 3 do not relate to the starting torque, the idle-speed control, the torque control and limitation, the external torque intervention, the engine-smoothness regulator, the active surge damper, the exhaust gas aftertreatment, the fuel cooling control, the vehicle-speed controller (cruise control), the engine mount control, the air-conditioner compressor control, the glow-time control or the vehicle immobilizing system.

Although the functional scopes of master 2 and slave 3 in the exemplary embodiment illustrated in FIG. 6 are relatively substantially distinguished from one another, the same computer programs still run in both control units 2, 3, in slave 3, not all values calculated by the computer programs being used for driving actuators 17 or for fulfilling the control and/or regulation function. However, this does not change the fact that, in the computer system of FIG. 6 as well, the same computer programs are executed time-synchronously in master 2 and slave 3 with a settable time lag, and that the same sensor data are available in master 2 and slave 3.

The errors for sensors 13, 14 and actuators 16, 17 are stored separately in master 2 and slave 3. The stored information pertaining to the occurrence of an error may be exchanged and, respectively, synchronized between master 2 and slave 3. However, information pertaining to the circumstances of the error (such as when, what, where) remain in the error memories and is not synchronized. To be able to read out the error memories via diagnosis interfaces 19.1, 20.1 for maintenance purposes, the error memories must be addressable via different addresses (so-called wake-up addresses). This is necessary since the software of master 2 and of slave 3 is otherwise identical. The error memories may be read out via diagnosis interfaces 19.1, 20.1, for example, via a CAN bus (KWP2000) or via a serial interface (K line).

In the master-slave systems described exemplarily in the figures, two control units 2, 3 are interconnected via a CAN bus 4. Sensors 13, 14 are only partially linked to one control unit 2, 3. Thus, while maintaining the data consistency, the sensor data must be transmitted within the time-synchronous tasks from one control unit 2; 3 to the other control unit 3; 2.

The data multiplexing of the CAN messages is carried out using data identifiers (data IDs). The messages used for equalizing sensors 13 in the master-slave system have the following structure:

| CAN ID | data ID | data | data | data | data | data | data | data |
|---|---|---|---|---|---|---|---|---|

The time-synchronous message transmission is carried out in the present exemplary embodiments in a 10 ms pattern.

In the process, a block of CAN messages is always exchanged between control units 2, 3. The end of the block and thus the end of the data transmission is recognized by way of a defined CAN identifier. This CAN identifier is sent exclusively as the last message in the CAN transmission block. The last CAN message has the following structure:

| Special CAN ID | data ID | CS | task counter | data | data | data | data | data |
|---|---|---|---|---|---|---|---|---|

Data ID: multiplexing information
CS: check sum of all message bytes of a transmission block
Task counter: scheduling information/time-slice counter An example of a CAN transmission block:

| transmission sequence | CAN ID | message contents | multiplexing between the 10 ms tasks |
|---|---|---|---|
| 1 | 401 | data | yes |
| 2 | 402 | data | yes |
| 3 | 403 | data | yes |
| last | 404 | CS, task counter, data | yes |

Figure 7:
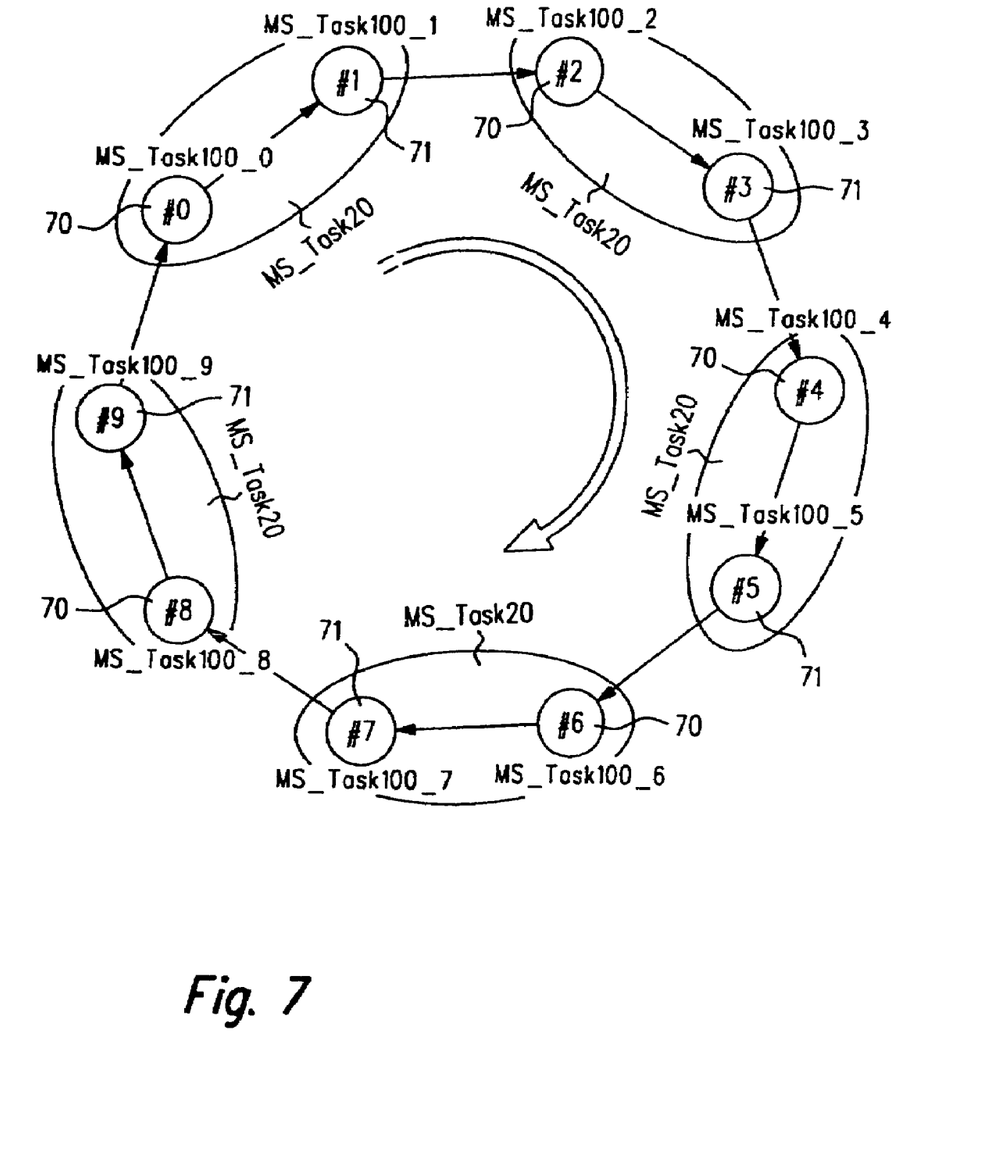
FIG. 7 shows a diagram including the breakdown and processing of the time slices in a computer system according to the exemplary embodiment and/or exemplary method of the present invention.

In the exemplary embodiments described above, the 20 ms tasks (MS_Task20) and the 100 ms tasks (MS_Task100_0 through MS_Task100_9) in both control units 2, 3 are subdivided into 10 ms parts (time slots 70, 71) and scheduled in the 10 ms time-slot pattern. This means that, after 20 ms, all parts of the 20 ms task and, after 100 ms, all parts of the 100 ms task are carried out (compare the breakdown and processing of the time slices in FIG. 7). Master control unit 2 sends CAN messages every 10 ms in order to transfer the measured sensor data 13 of master control unit 2 to slave control unit 3. In this CAN transmission, the information on which time slice in master 2 is currently being executed, is transmitted along with the other information in the form of a counter (task counter). This number of the current time slice that is sent along is indicated within the 100 ms tasks (MS_Task100_0 through MS_Task100_9) (#i, i=0 through 9). Slave control unit 3 synchronizes the start of its 10 ms task using the finite state machine illustrated in FIG. 4. Slave control unit 3 transfers the counter for the current 10 ms time slice to master control unit 2. In this manner, the master is able to monitor the sequence of the time slices in slave 3.

Figure 8:
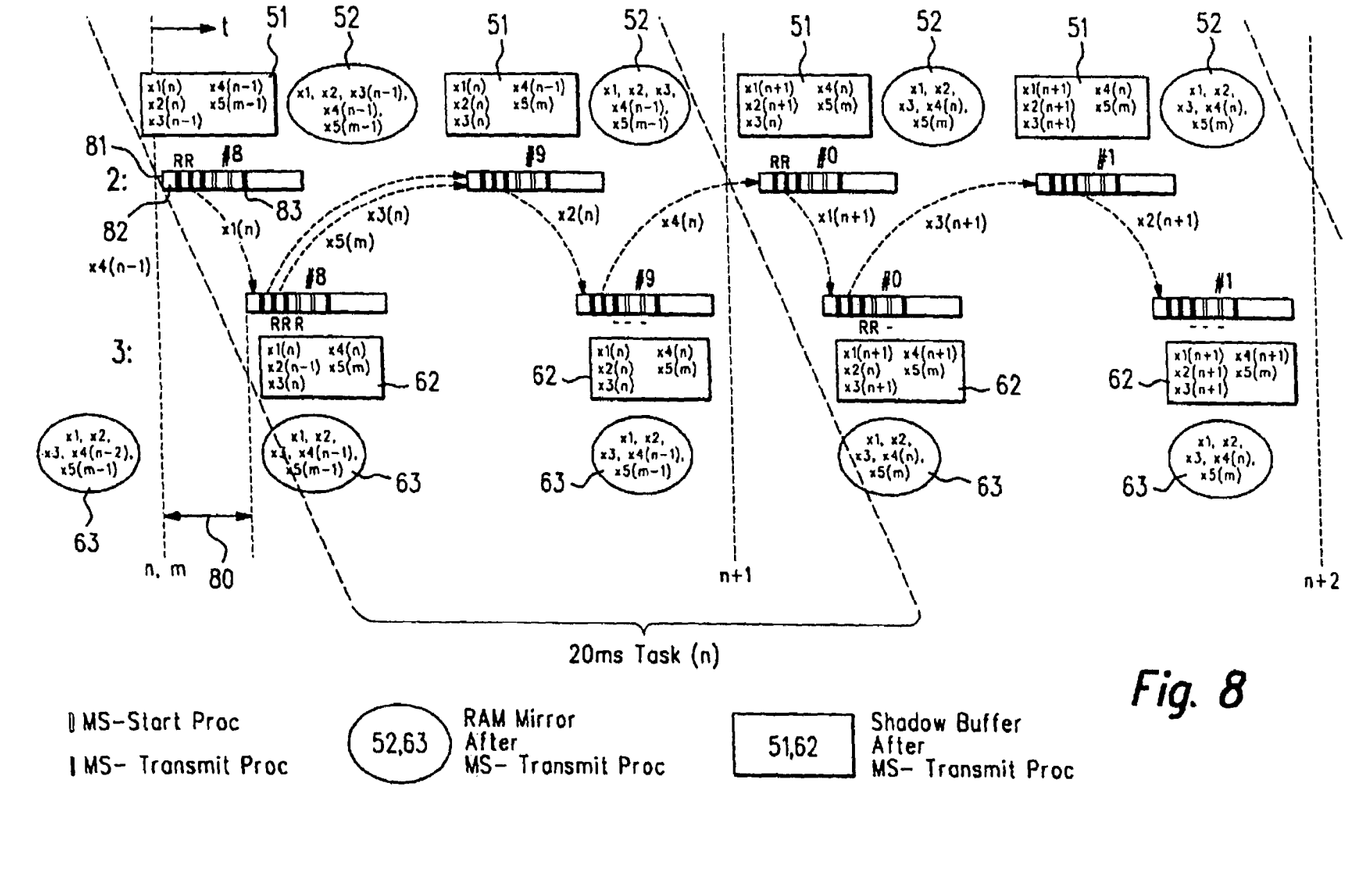
FIG. 8 shows signal characteristics in a computer system according to the exemplary embodiment and/or exemplary method of the present invention for clarifying the data exchange between the master and slave of the computer system.

The data exchange in the master-slave system is explained in greater detail with reference to FIG. 8. Sensor data x1 through x5 are processed as input signals in the computer programs of master 2 and slave 3, sensor data x1 and x2 being directly available at master 2 and sensor data x3 through x5 being directly available at slave 3. n denotes the time base of the 20 ms task; m the time base of the 100 ms task. Sensor data x1 through x4 are processed in the 20 ms task, whereas sensor data x5 are processed in the 100 ms task. Reference numeral R in FIG. 8 signifies that a data-update request bit is set. In FIG. 8, master 2 is shown in the top half and slave 3 in the bottom half.

In a time slice n, data are initially processed in a 10 ms time slot #8 (reference numeral 81), and then in a 10 ms time slot #9. At the beginning of a time slot 81, a master-slave starting procedure 82 is executed, as well as a master-slave transmitting procedure 83 for data transmission.

In time slot #8, intermediate memory 51 of master 2 contains sensor data x1(n) and x2(n) of the current 20 ms time slice n. Moreover, it contains sensor data x3(n−1) and x4(n−1) of the preceding 20 ms time slice n−1. Sensor data x4(n−1) were transmitted in the preceding time slice n−1 from slave 3 to master 2 and stored there in intermediate memory 51. Finally, intermediate memory 51 also contains sensor data x5(m−1) of the preceding 100 ms time slice m−1. In addition, in time slot #8, read-write memory 51 of master 2 contains sensor data x1(n−1), x2(n−1), x3(n−1), x4(n−1) of the preceding 20 ms time slice n−1, as well as sensor data x5(m−1) of the preceding 100 ms time slice m−1.

The computer programs in slave 3 are executed in time slices time-synchronously with a settable time lag 80 relative to master 2. Intermediate memory 62 of slave 3 contains sensor data x1(n), x3(n) and x4(n) in time slice n that is delayed by time lag 80, data x3(n) and x4(n) being directly available at slave 3. Sensor data x1(n) were transmitted during time lag 80 in a CAN message from master 2 to slave 3 and stored there in intermediate memory 62. In addition, intermediate memory 62 contains sensor data x2(n–1) of the preceding 20 ms time slice n–1, as well as sensor data x5(m) of the current 100 ms time slice m. Values x1(n–1), x2(n–1), x3(n–1), x4(n–1) and x5(m–1) of the preceding time slices n–1, m–1 are still stored in read-write memory 63. Current sensor data x3(n) and x5(m), that slave 3 had just read in from sensors 13, are transmitted from slave 3 to master 2 and stored there in intermediate memory 51.

In time slot #9, current sensor data x2(n), that master 2 had just read in from sensors 13, are transmitted in a CAN message to slave 3. In the same way, current sensor data x4(n), that slave 3 had just read in from sensors 13, are transmitted in a CAN message to master 2. Thus, all current sensor data x1(n) through x4(n) and x5(m) are available in both control units 2, 3. In subsequent time slice n+1, current sensor data are transmitted into read-write memories 52, 63 of master 2 and of slave 3, where they are available for execution of the computer programs.

Moreover, in time slice n+1, current sensor data x1(n+1), x2(n+2) are again read in from master 2 and current sensor data x3(n+1), x4(n+1) from slave 3 directly from sensors 13 and transmitted in time slots #0 and #1 via CAN data bus 4 to the respective other control unit 3; 2, so that, at subsequent time slot n+2, current sensor data x1(n+1) through x4(n+1), as well as x5(m) are available for execution of the computer programs. Sensor data x5 are read in only in every fifth time slice from slave 3, thus, the next time, again in time slice n+5.

What is claimed is:

1. A method for operating at least two interconnected control units, the method comprising:
accessing sensor data with the control units, each of the control units having a housing with a plurality of inputs for connecting to a plurality of sensors and processors, wherein one of the control units is a master control unit and the remaining control unit is a slave control unit that receives synchronization information from the master unit;
executing at least one software program for controlling operational sequences on all the control units, in a vehicle; and
continuously synchronizing the control units by continuously transmitting synchronization information between the control units;
wherein the control units execute the same software program time-synchronously using a settable time lag.

2. The method of claim 1, wherein the same sensor data are available in the control units.

3. The method of claim 1, wherein, in each case, the control units receive only one portion of all sensor data from the sensors, and the control units exchange sensor data, so that all sensor data are available in each control unit.

4. The method of claim 1, wherein, in the individual control units, the system holds off on executing the software programs time-synchronously while accessing the sensor data until all up-to-date sensor data are available in each control unit.

5. The method of claim 1, wherein the time lag is adjusted as a function of the time duration required for exchanging the sensor data among the control units.

6. The method of claim 5, wherein the time lag is regulated as a function of the time duration required for exchanging the sensor data among the control units.

7. The method of claim 5, wherein the time lag is adjusted or regulated in a damped manner as a function of the time duration required for exchanging the sensor data among the control units.

8. The method of claim 1, wherein the time lag is adjusted during operation of the control units.

9. The method of claim 1, wherein the control units are synchronized solely by exchanging useful data via the data transmission media, without transmitting separate synchronization information.

10. A computer system comprising:
at least two continuously interconnected control units, each of the control units having a housing with a plurality of inputs for connecting to a plurality of sensors and processors, wherein one of the control units is a master control unit and the remaining control unit is a slave control unit that receives synchronization information from the master unit; and
a data transmission medium that connects the control units to continuously exchange synchronization information between the control units,
wherein the control units access sensor data and execute in each case at least one software program for controlling operational sequences, in a vehicle, and
wherein the control units execute the same computer program time-synchronously using a time lag that is adjustable by setting arrangement.

11. The computer system of claim 10, wherein the master control unit transmits synchronization information to the slave control units.

12. The computer system of claim 11, wherein once the system is booted up, the slave control units are automatically synchronized to the time base of the master control unit.

13. The computer system of claim 10, wherein:
only one portion of the sensors is connected in each case to the control units, and in each case, the control units receive only one portion of all sensor data, and the control units exchange sensor data via the data transmission medium, so that all sensor data are available in each of the control units.

14. The computer system of claim 13, wherein the sensors are assigned to the control units and are linked to the control units assigned to them respectively so that, during operation of the computer system, a substantially uniform usage results on the average over time on the data transmission medium in both transmission directions.

15. The computer system of claim 10, wherein the individual control units include an arrangement for holding off on executing the software programs time-synchronously while accessing the sensor data until all up-to-date sensor data are available in each of the control units.

16. The computer system of claim 10, wherein each of the control units is subdivided into a hardware level, a hardware driver level, and an application software level, the computer program being for controlling the operational sequences running in the application software level, and the sensor data being transmitted independently of the application software level in the hardware driver level.

17. The computer system of claim 10, wherein the data are transmitted via the data transmission medium in accordance with the CAN (controller area network) protocol.

* * * * *